(12) United States Patent
Aoki et al.

(10) Patent No.: US 7,149,372 B2
(45) Date of Patent: Dec. 12, 2006

(54) OPTICAL DEVICE

(75) Inventors: Tsuyoshi Aoki, Kawasaki (JP); Yasuo Yamagishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/288,476

(22) Filed: Nov. 6, 2002

(65) Prior Publication Data
US 2003/0118262 A1  Jun. 26, 2003

(30) Foreign Application Priority Data
Dec. 26, 2001 (JP) .............................. 2001-393686

(51) Int. Cl.
G02B 1/295 (2006.01)
G02B 6/35 (2006.01)
(52) U.S. Cl. .................. 385/8; 385/16; 385/40
(58) Field of Classification Search .................. 385/80, 385/14, 129, 130, 131, 15, 31, 36, 4, 38, 385/40, 33, 37
See application file for complete search history.

(56) References Cited

U.S. PATENT DOCUMENTS

| | | | | |
|---|---|---|---|---|
| 4,669,816 A | * | 6/1987 | Thompson | 385/50 |
| 4,902,088 A | * | 2/1990 | Jain et al. | 385/8 |
| 5,317,446 A | * | 5/1994 | Mir et al. | 359/296 |
| 5,920,662 A | * | 7/1999 | Hinkov | 385/14 |
| 6,449,084 B1 | * | 9/2002 | Guo | 385/16 |
| 2003/0035614 A1 | * | 2/2003 | Glebov et al. | 385/21 |
| 2003/0108264 A1 | * | 6/2003 | Nishizawa et al. | 385/8 |

FOREIGN PATENT DOCUMENTS

| | | |
|---|---|---|
| JP | HEI 05-190553 A | 7/1993 |
| JP | 05-313214 | 11/1993 |
| JP | HEI 06-118454 A | 4/1994 |
| JP | HEI 07-30092 A | 1/1995 |
| JP | HEI 10-186418 A | 7/1998 |
| JP | HEI 11-195678 A | 7/1999 |
| JP | 2000-91371 A | 3/2000 |
| JP | 2000-180904 | 6/2000 |
| JP | 2000-180904 A | 6/2000 |
| JP | 2000-241836 A | 9/2000 |
| JP | 2001-118876 | 4/2001 |
| JP | 2003-84319 | * 3/2003 |

* cited by examiner

Primary Examiner—Frank G. Font
Assistant Examiner—James P. Hughes
(74) Attorney, Agent, or Firm—Staas & Halsey LLP

(57) ABSTRACT

The optical device comprises a first substrate 10 having a control circuit formed on; optical waveguide layer 40 formed above the first substrate and having a refractive index changed by electro-optic effect; and second substrates 14a, 14b having prism electrodes 18 for applying voltages to the optical waveguide layer. The control circuit and the prism electrodes are electrically connected to each other via columnar conductors 20. Even in a case where thermal expansion coefficients of the control substrate and of the light deflection substrates are very different from each other, the pins are flexed corresponding to eternal forces, whereby junction is protected from being damaged in the joining processing. Thus, the optical switch can be highly reliable.

20 Claims, 9 Drawing Sheets

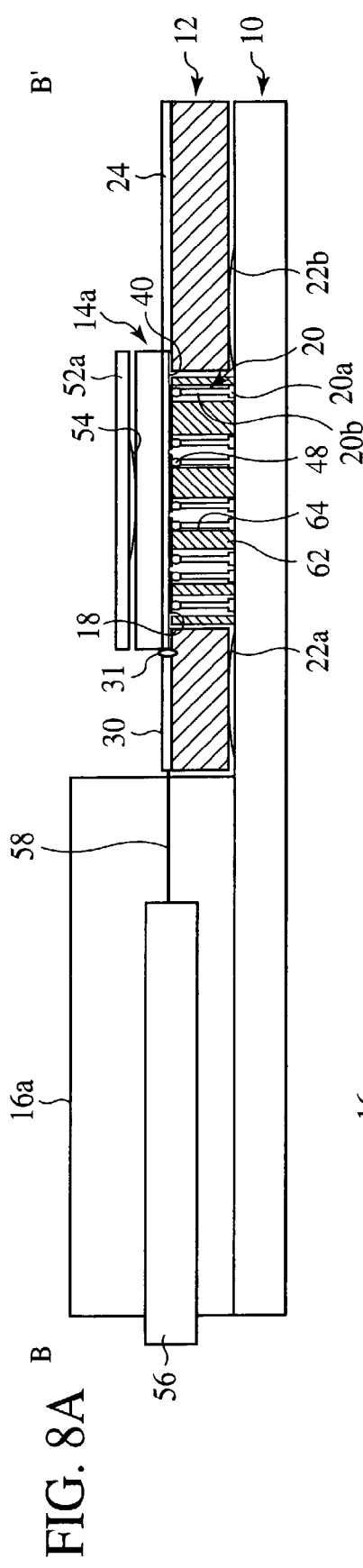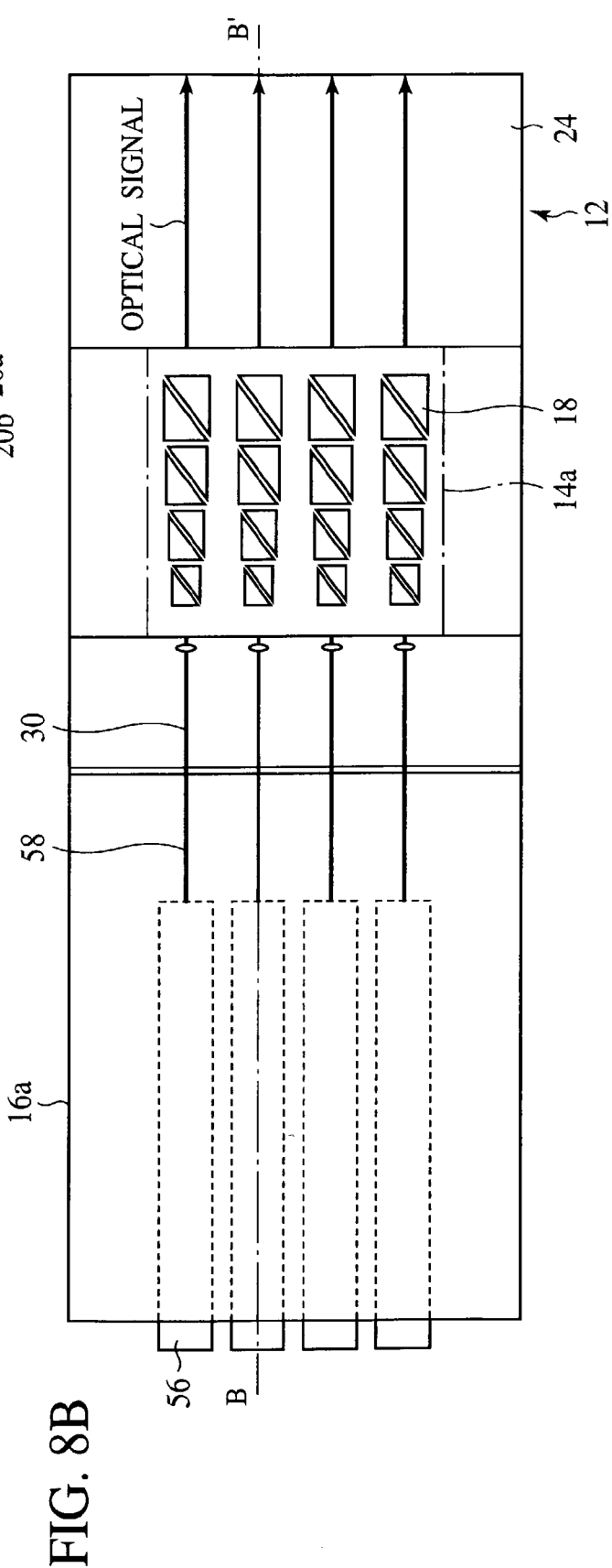
FIG. 8A
FIG. 8B

OPTICAL DEVICE

BACKGROUND OF THE INVENTION

The present invention relates to an optical device, more specifically to an optical device which can switch optical paths and deflect light.

Optical switches function as relay points for switching paths of light in an optical communication network and is an essential member of optical communication networks.

Recently, an optical switch which changes over paths of light by means of electro-optic effect (EO effect) has been proposed.

The proposed optical switch applies electric fields to an optical waveguide layer to control refractive indexes by the electro-optic effect, and can perform high-speed switching. The proposed optical switch requires no large current, and can drastically reduce electric power consumption in comparison with the thermo-optical switches. The proposed optical switch has no mechanically operative part, which makes the proposed optical switch highly reliable.

The proposed optical switch includes a number of prism electrodes in the deflecting unit. In the proposed optical switch, suitable voltages are applied to the respective prism electrodes to thereby deflect optical signals to required directions to lead the optical signals to desired channels.

As means for applying voltages to the respective prisms, it can be proposed, for example, to connect wires to the prisms electrodes by bonding. FIGS. 9A and 9B are diagrammatic views of the application of voltages to the prism electrodes through the wires connected to the prism electrodes by bonding.

As shown in FIGS. 9A and 9B, a slab waveguide layer 140 is formed on an optical waveguide substrate 112. A number of prism electrodes 118 are formed on the slab optical waveguide layer 140. Wires 102 are connected to the respective prism electrodes 118 by bonding. In the optical switch shown in FIGS. 9A and 9B, voltages are applied to the respective prism electrodes 118 through the respective wires 102.

However, the application of voltages to the prism electrodes 118 through the wires 102 connected by bonding makes the leading of the wires 102 very complicated.

Here, it is possible that an optical waveguide substrate with vias buried in is mounted on a control substrate, and voltages are applied to the prism electrodes from the control substrate via solder bumps and the vias. However, in this case, there is a risk that in the processing of joining the optical waveguide substrate and the control substrate, large shearing stresses may be applied to the solder bumps. That is, in a case where the optical waveguide substrate is formed of, e.g., ceramics, and the control substrate is formed of, e.g., a resin, the thermal expansion coefficient of the optical waveguide substrate and that of the control substrate are very different from each other. Due to the thermal expansion coefficient difference between the optical waveguide substrate and the control substrate, large shearing stresses are applied to the solder bumps, which consequently leads to lower reliability.

SUMMARY OF THE INVENTION

An object of the present invention is to provide an optical device which can apply voltages to the respective prism electrodes without lower reliability.

According to one aspect of the present invention, there is provided an optical device comprising: a first substrate with a control circuit formed on; and a second substrate disposed above the first substrate and including an optical waveguide layer having a refractive index changed by electro-optic effect and a prism electrode which apply a voltage to the optical waveguide layer, the control circuit and the prism electrode being electrically connected by a columnar conductor.

As described above, according to the present invention, the control substrate and the prism electrodes are electrically connected to each other via the pins. Even in a case where thermal expansion coefficients of the control substrate and of the light deflection substrates are very different from each other, the pins are flexed corresponding to external forces, whereby junction is protected from being damaged in the joining processing. Thus, the optical switch according to the present invention can be highly reliable.

According to the present invention, the optical waveguide substrates are mounted on the optical waveguide substrate with the side of the optical deflection substrates, where the slab waveguide layer is formed opposed to the side of the optical waveguide substrate, where the slab optical waveguide substrates are mounted, which permits the slab optical waveguide layer of the optical deflection substrates and the slab optical waveguide layer of the optical waveguide substrate can be aligned with each other without failure. According to the present embodiment, good optical coupling can be realized between the optical waveguide layer of the optical deflection substrates and the slab optical waveguide layer of the optical waveguide substrate. Resultantly, the optical switch according to the present invention can have good optical characteristics.

According to the present invention, the leaf springs are sandwiched between the control substrate and the optical waveguide substrates and between the optical waveguide substrates and the optical deflection substrate, whereby the optical deflection substrate and the optical waveguide substrates can be kept in close contact with each other. Thus, according to the present invention, the slab optical waveguide layer of the optical deflection substrates and the slab optical waveguide layer of the optical waveguide substrates can be aligned with high precision, and good optical coupling can be obtained.

According to the present invention, the leaf springs and the support plates are formed of a conductor, and the light deflection substrates are grounded by the leaf springs and the support plates, whereby the accumulation of static electricity in the light deflection substrates can be prevented. Thus, according to the present invention, breakage of the elements due to the static electricity can be precluded, and the optical switch according to the present invention can be highly reliable.

BRIEF DESCRIPTION OF THE DRAWINGS

FIGS. 8A and 8B are diagrammatic views of the optical switch according to one modification of the embodiment of the present invention, which show an operation thereof.

DETAILED DESCRIPTION OF THE INVENTION

Figure 1A:
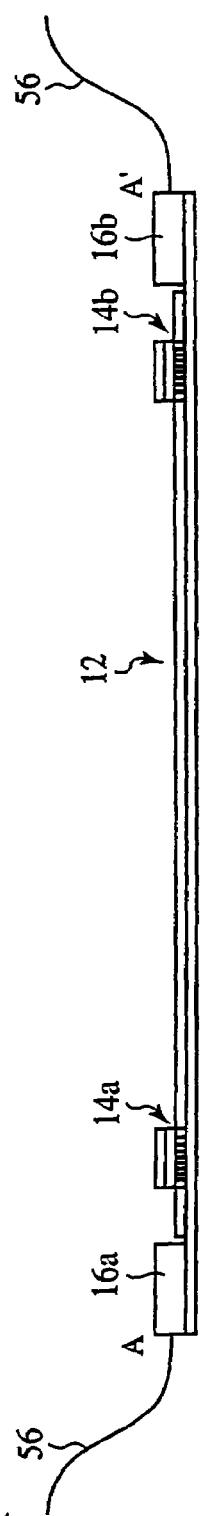
FIGS. 1A and 1B are diagrammatic views of the optical switch according to one embodiment of the present invention (Part 1).
Figure 1B:
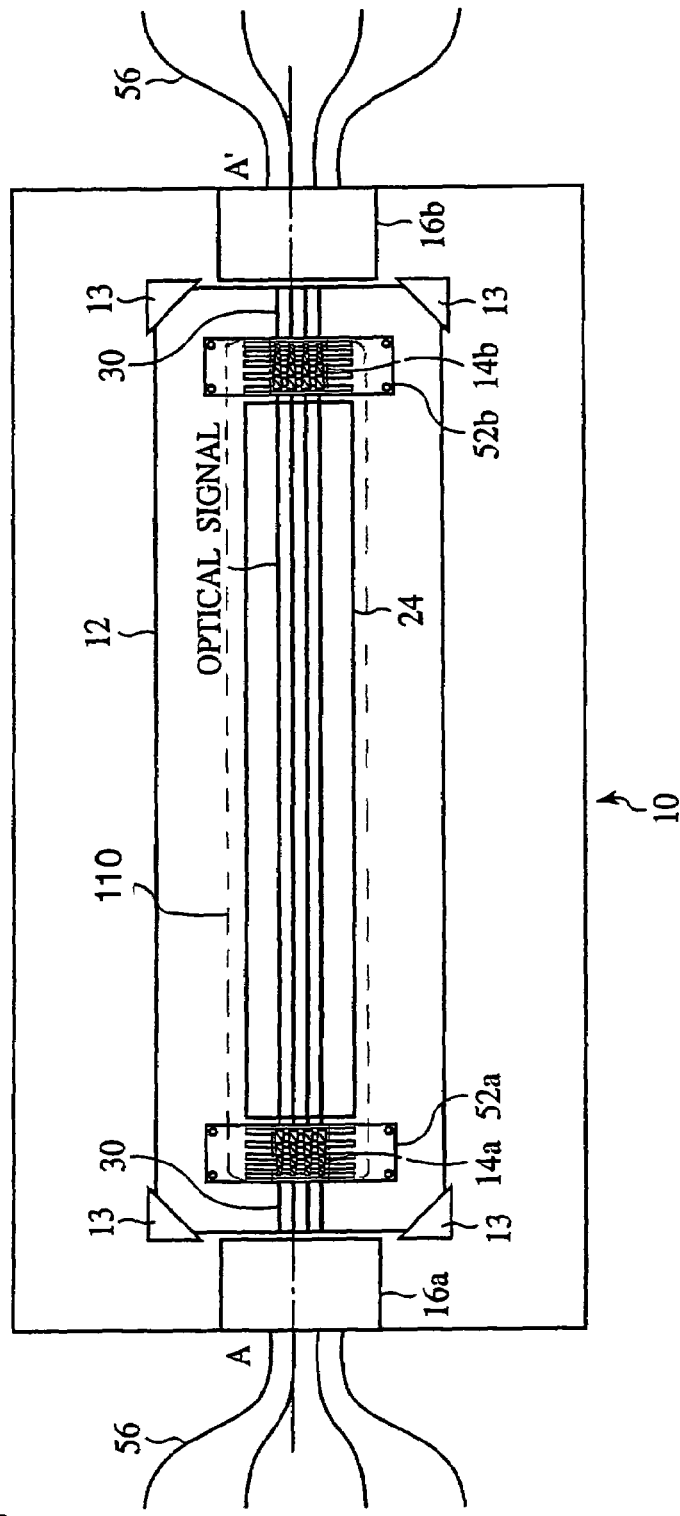
Figure 2A:
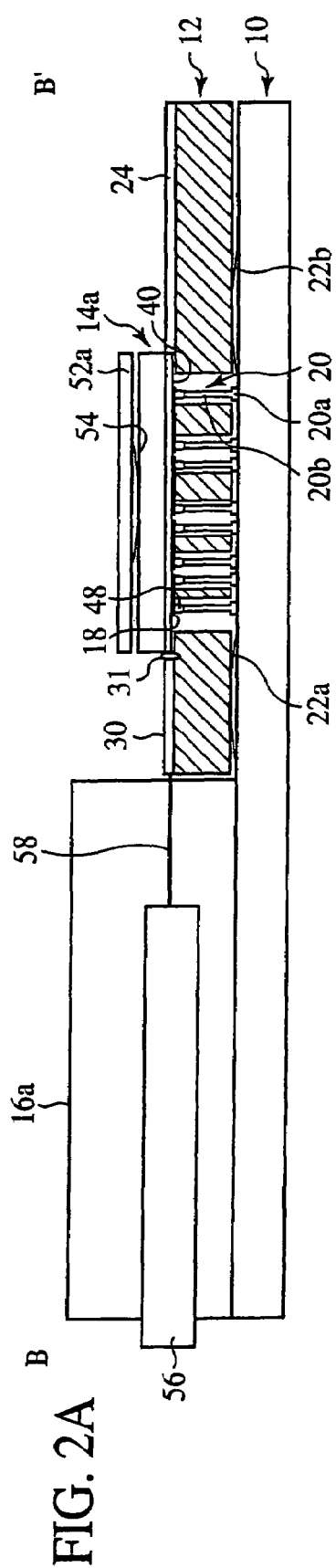
FIGS. 2A and 2B are diagrammatic views of the optical switch according to the embodiment of the present invention (Part 2).
Figure 2B:
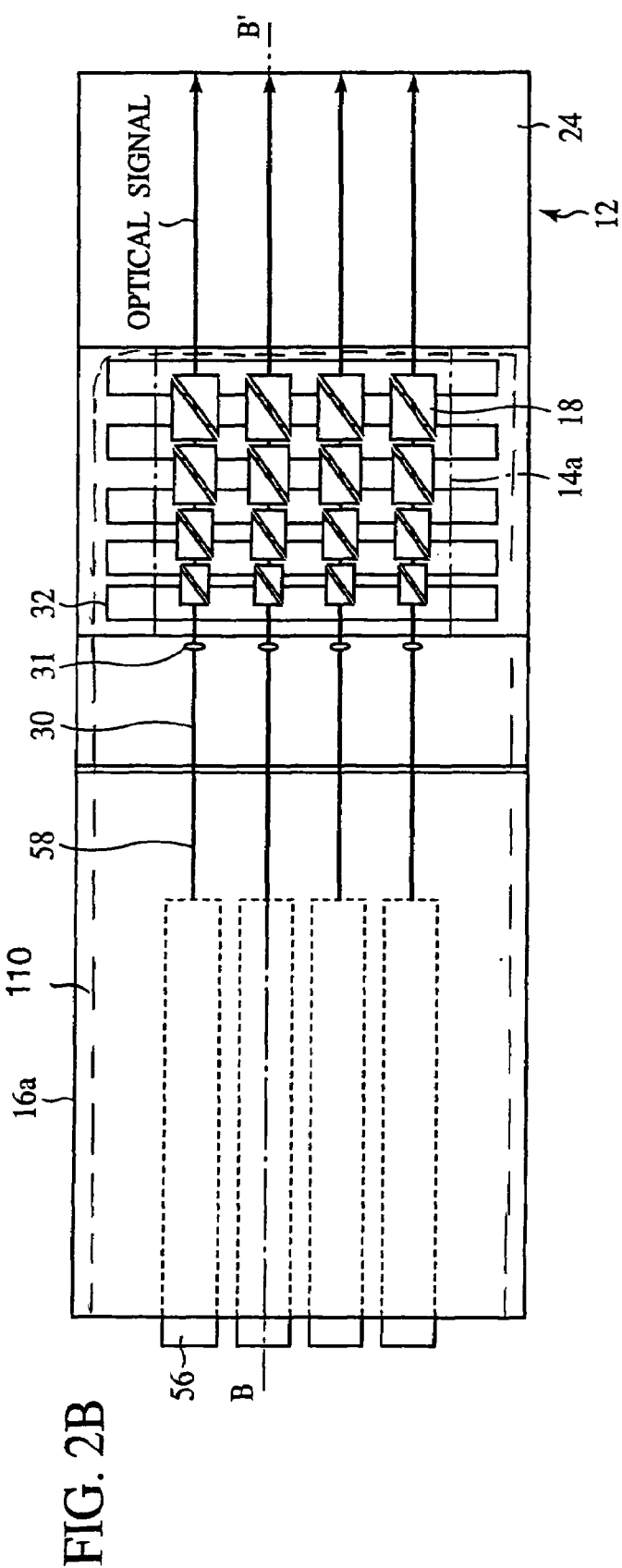
Figure 3:
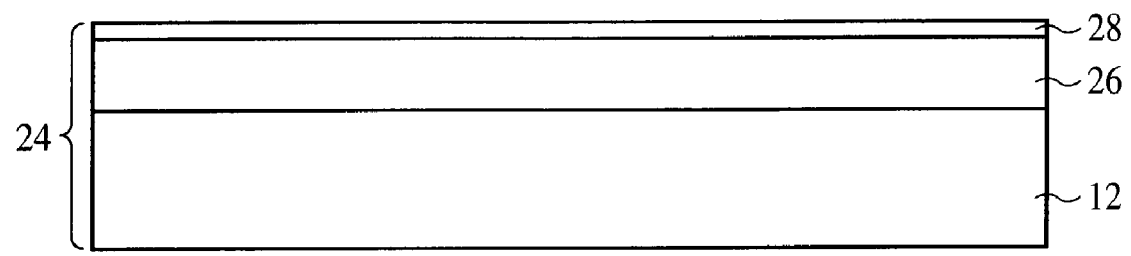
FIG. 3 is a sectional view of an optical waveguide substrate.
Figure 4A:
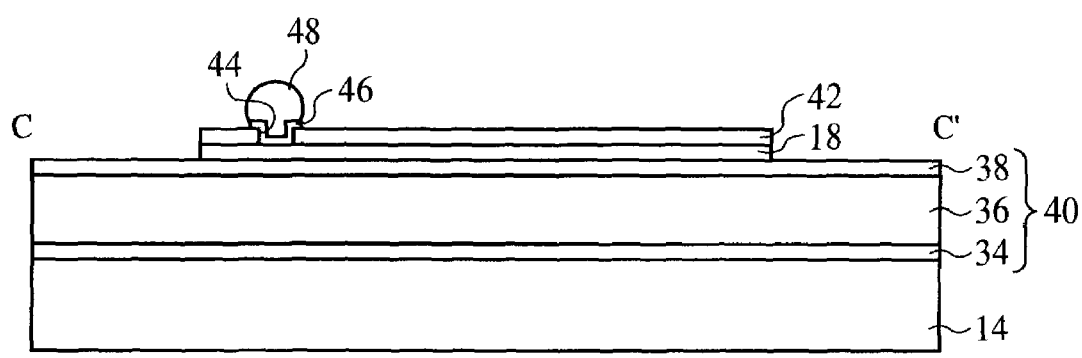
FIGS. 4A and 4B are diagrammatic views of an optical deflection substrate (Part 1).
Figure 4B:
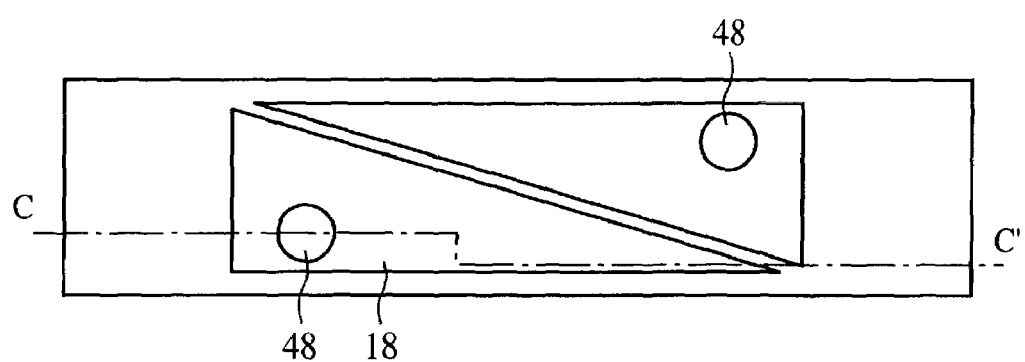
Figure 5A:
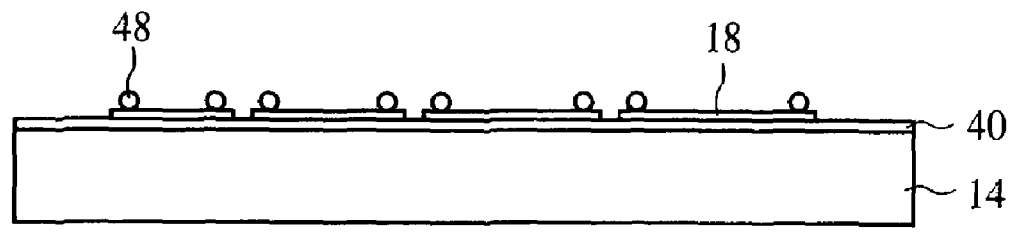
FIGS. 5A and 5B are diagrammatic views of an optical deflection substrate (Part 2).
Figure 5B:
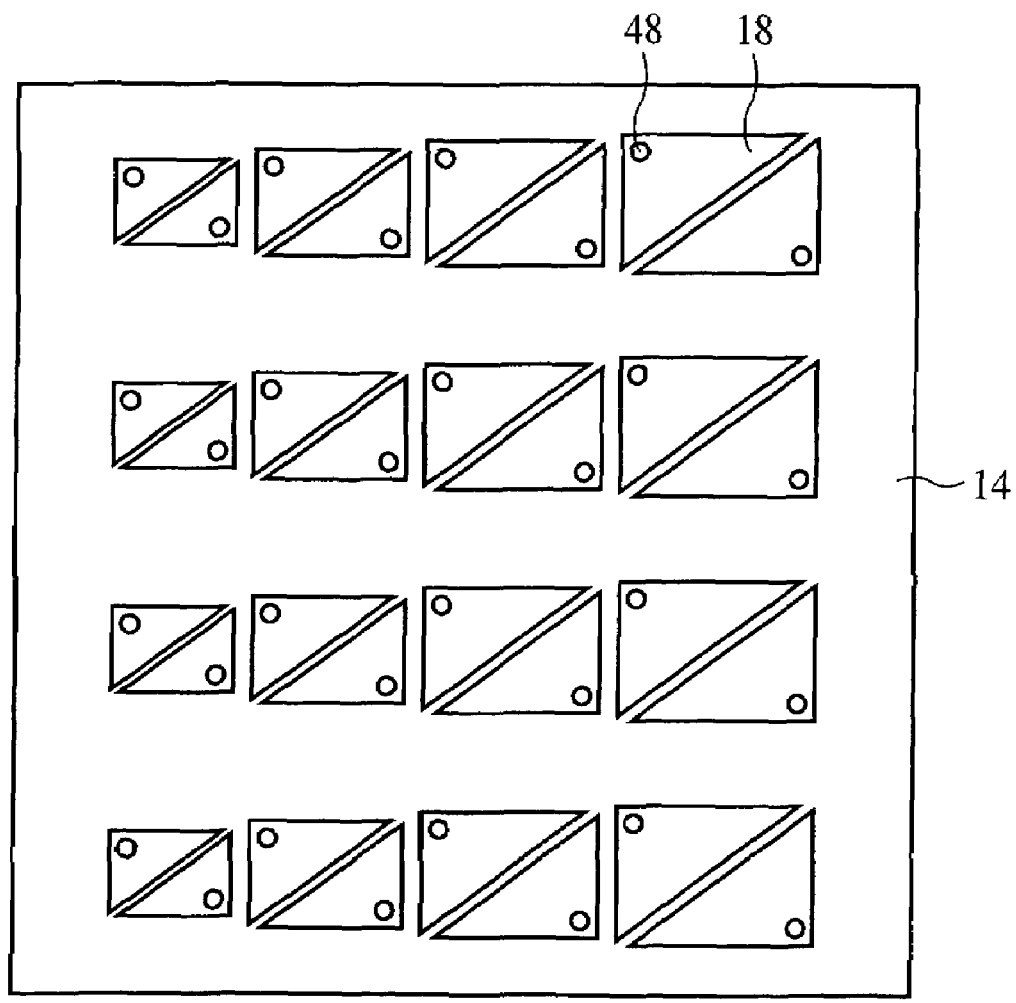
Figure 6:
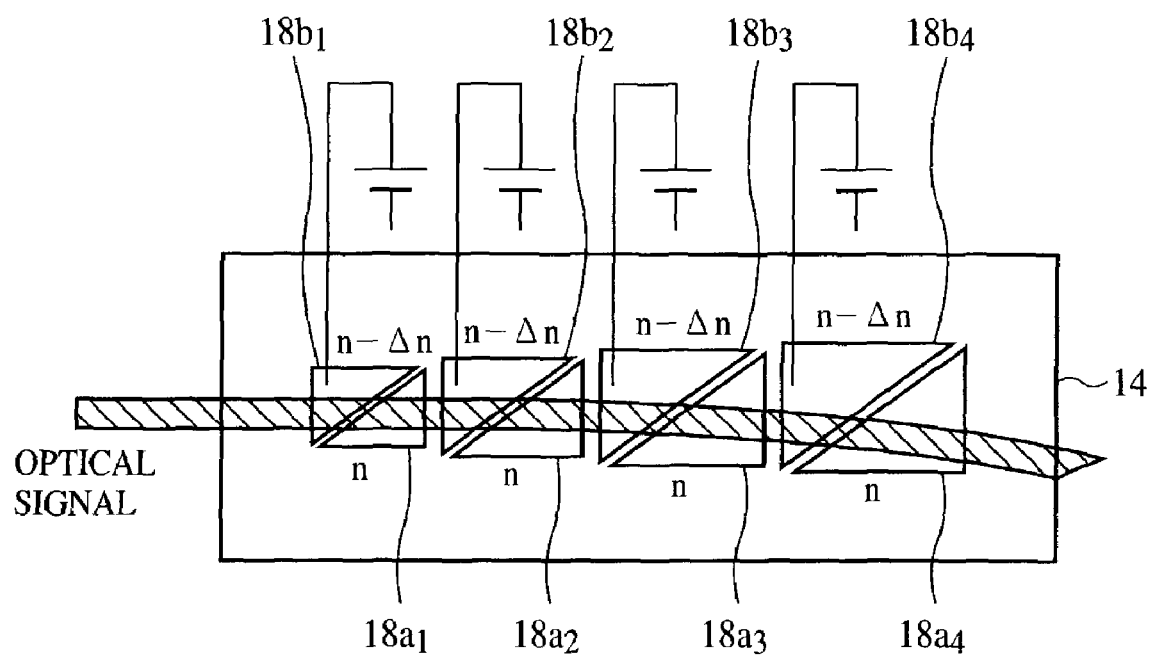
FIG. 6 is a conceptual view of an operation principle of the optical switch according to the embodiment of the present invention.
Figures 7A, 7B:
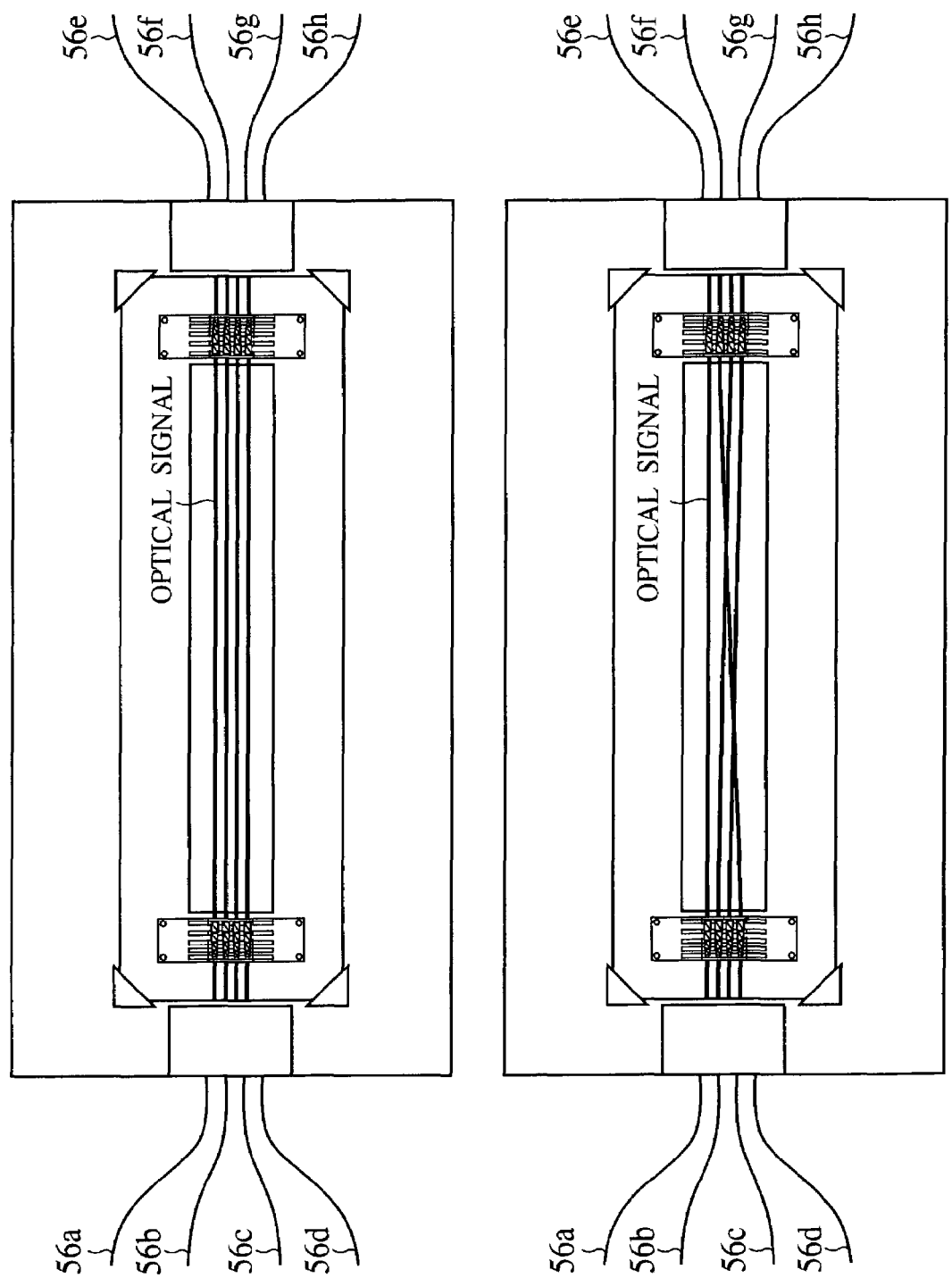
FIGS. 7A and 7B are views of the optical switch according to the embodiment of the present invention, which show an operation thereof.
Figure 9A:
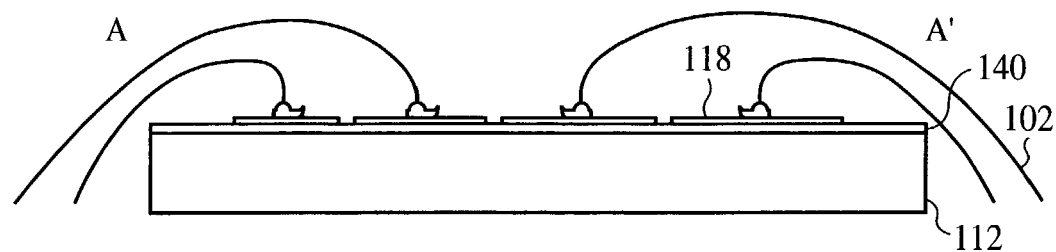
FIGS. 9A and 9B are diagrammatic views of the application of voltages to the prism electrodes through the wires connected to the prism electrodes by bonding.
Figure 9B:
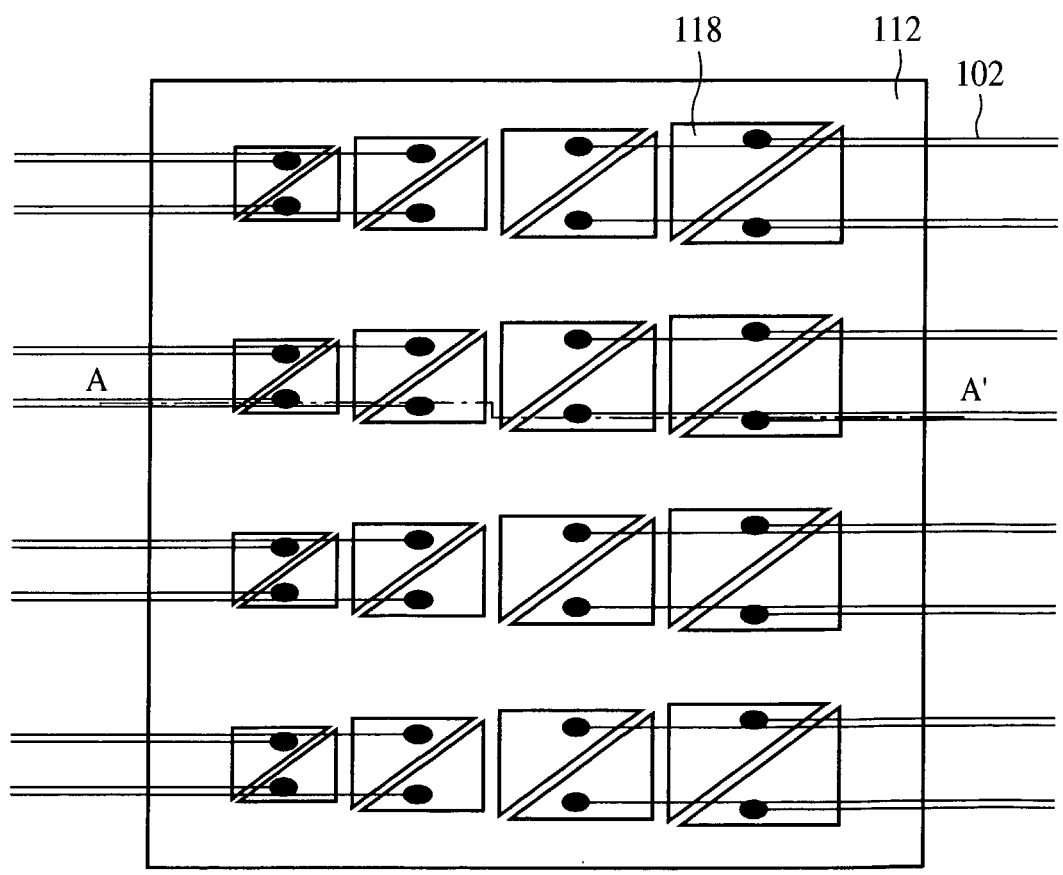

The optical switch according to one embodiment of the present invention will be explained with reference to FIGS. 1A to 7B. FIGS. 1A and 1B are diagrammatic views of the optical switch according to the present embodiment (Part 1). FIG. 1A is a sectional view, and FIG. 1B is a plan view thereof. FIG. 1A is the sectional view along the line A–A' in FIG. 1B. FIGS. 2A and 2B are diagrammatic views of the optical switch according to the present embodiment (Part 2). FIG. 2A is a sectional view, and FIG. 2B is a plan view thereof. FIG. 2B is the sectional view along the line B–B'. FIG. 3 is a sectional view of an optical waveguide substrate. FIGS. 4A and 4B are diagrammatic views of an optical deflection substrate (Part 1). FIG. 4A is a sectional view, and FIG. 4B is a plan view. FIG. 4A is the sectional view along the line C–C' in FIG. 4B. FIGS. 5A and 5B are diagrammatic views of the optical deflection substrate (Part 2). FIG. 5A is a sectional view, and FIG. 5B is a plan view. FIG. 6 is a conceptual view of an operation principle of the optical switch according to the present embodiment. FIGS. 7A and 7B are plan view of the optical switch according to the present embodiment, which shows an operation of the optical switch.

In the present embodiment, the present invention is explained by means of an application to an optical switch, but the present invention is applicable to all the optical devices.

As shown in FIGS. 1A and 1B, the optical switch according to the present embodiment comprises a control substrate 10 where a control circuit (not shown) is formed, an optical waveguide substrate 12 mounted on the control substrate 10, optical deflection substrates 14a, 14b mounted on the optical waveguide substrate 12, and connectors 16a, 16b disposed on the control substrate 10.

As described above, the control circuit is formed on the underside of the control substrate 10 of ceramics. The control circuit 110 controls propagation directions of optical signals by applying suitable voltages to the prism electrodes 18 formed on the light deflection substrates 14a, 14b.

Leaf springs 22a, 22b are disposed between the control substrate 10 and the optical waveguide substrate 12. The leaf springs 22a, 22b are for keeping the optical waveguide substrate 12, and the optical deflection substrates 14a, 14b in close contact with each other.

The optical waveguide substrate 12 is secured to the control substrate 10 by fixing members 13.

A slab optical waveguide layer 24 is formed on the upper surface of the optical waveguide substrate 12. The slab optical waveguide layer 24 is formed at the center of the upper surface of the optical waveguide substrate 12.

FIG. 3 is a sectional view of the optical waveguide substrate.

As shown in FIG. 3, a core layer 26 forming a Ge diffused region is formed on a quartz substrate 12 which functions as a lower clad layer. The core layer 26 and the quartz substrate 12 have refractive indexes different from each other.

An upper clad layer 28 of $SiO_2$ is formed on the core layer 26. The upper clad layer 28 can be formed by, e.g., plasma CVD. The upper clad layer 28 has a refractive index which is substantially equal to that of the quartz substrate 12 functioning also as the lower clad layer.

The quartz substrate 12 functioning also as the lower clad layer, the core layer 26, and the upper clad layer 28 constitute the slab optical waveguide layer 24.

As shown in FIGS. 1A to 2B, channel waveguides 30 of a high molecular polymer are formed on the optical waveguide substrate 12. The ends of the channel waveguide layers 30 are patterned in a shape which permits transverse collimation.

Lenses 31 are disposed at the ends of the channel waveguides 30. The lenses 31 optically couple the channel waveguides 30 with a slab optical waveguide layer 40 of the light deflection substrate 14a, which will be described later.

Openings 32 are formed in the optical waveguide substrate 12 in a striped shape. The openings 32 ensure regions for accommodating pins 20. The openings 30 are formed by, sand blasting.

Electrode pads (not shown) are formed on the upper surface of the control substrate 10 in the openings 32.

The pins 20 of Cu are mounted on the electrode pads. The pins 20 electrically interconnect the control circuit and the prism electrodes 18. The pins 20 are secured to the electrodes pads by, e.g., solders of high melting point.

As shown in FIGS. 2A and 2B, each pin 20 has a base portion 20a and a columnar portion 20b which are formed in one-piece. The base portion 20a supports the columnar portion 20b. The base portion 20a has a relatively large bottom area, which facilitates soldering the pins 20 to the electrode pads. On the other hand, the columnar portion 20b of each pin is thin and is flexible in accordance with external forces. The pins 20 mounted on the electrode pads are electrically connected to the control circuit 110 through vias (not shown) buried in the control substrate 10.

The light deflection substrates 14a, 14b are mounted on the optical waveguide substrate 12.

As shown in FIGS. 4A and 4B, a lower clad layer 34 of, e.g., a 1500 nm-thickness PLZT film is formed on an STO substrate 14 doped with Nb. A composition of the lower clad layer 34 is, e.g., $Pb_{0.91}La_{0.09}(Zr_{0.65}Ti_{0.35})O_3$. A refractive index of the lower clad layer 34 is, e.g., 2.45. The lower clad layer 34 can be formed by, e.g., sol-gel process.

A core layer 36 of, e.g., a 2000 nm-thickness PZT film is formed on the lower clad layer 34. A composition of the core layer 36 can be, e.g., $Pb(Zr_{0.52}Ti_{0.48})O_3$. A refractive index of the core layer 36 having such composition is, e.g., 2.56. The core layer 36 can be formed by sol-gel process.

An upper clad layer 38 of, e.g., a 1500 nm-thickness PLZT film is formed on the core layer 36. A composition of the upper clad layer 38 is $Pb_{0.91}La_{0.09}(Zr_{0.65}Ti_{0.35})O_3$, which is the same as that of the lower clad layer 34. A refractive index of the upper clad layer 38 is, e.g., 2.45, which is the same as that of the lower clad layer 34. The upper clad layer 38 can be formed by, e.g., sol-gel process, as can be the lower clad layer 34.

The lower clad layer 34, the core layer 36 and the upper clad layer 38 constitute the slab waveguide layer 40.

As shown in FIGS. 4A to 5B, prism electrodes 18 of, e.g., a 200 nm-thickness Au film are formed on the slab optical waveguide layer 40. The prism electrodes 18 can be formed by, e.g., sputtering.

The prism electrodes 18 apply electric fields to the optical waveguide layer 40 to control refractive indexes of light in the region sandwiched by the prism electrodes 18 and the substrate 14.

PZT and PLZT forming the optical waveguide layer 40 are materials whose refractive indexes are changed by electro-optic effect when electric fields are applied to. Because the optical waveguide layer 40 are formed of the materials, whose refractive indexes are changed by electro-optic effect, refractive indexes of the region sandwiched by the prism electrodes 18 and the substrate 14 are changed when the application of a voltage to the prism electrodes 18 is turned on and off.

In the present specification, the regions sandwiched by the prism electrodes 18 and the substrate 14 and whose refractive indexes are changed by the application of electric fields are called prism regions. The prism regions substantially function as prisms and can deflect light.

A solder resist 42 is formed on the prism electrodes 18. Contact holes 44 are formed in the solder resist 42 down to the prism electrodes 18. Electrodes pads 46 are formed in the contact holes 44. The electrode pads 46 are electrically connected to the prism electrodes 18 through the contact holes 44.

Solder bumps 48 of solders of a low melting point are formed on the electrode pads 46.

Thus, light deflection substrates 14a, 14b are thus formed.

The light deflection substrates 14a, 14b are mounted on the optical waveguide substrate 12 with the side where the slab optical waveguide layer 40 and the prism electrodes 18 are formed opposed to the optical waveguide substrate 12.

The prism electrodes 18 formed on the optical deflection substrates 14a, 14b are connected to the pins 20 via the solder bumps 48.

Support plates 52a, 52b of stainless steel are disposed on the light deflection substrates 14a, 14b. Leaf springs 54, of, e.g., copper are sandwiched between the optical deflection substrates 14a, 14b and the support plates 52a, 52b. The leaf springs 54 keep the light deflection substrates 14a, 14b in close contact with the optical waveguide substrate 12 in cooperation with the leaf springs 22a, 22b sandwiched between the control substrate 10 and the optical waveguide substrate 12.

The optical deflection substrates 14a, 14b are grounded through the leaf springs 54 and the support plates 52a, 52b. The optical deflection substrates 14a, 14b are grounded to thereby prevent the accumulation of static electricity in the light deflection substrates 14a, 14b, and breakage of the elements due to the static electricity can be precluded.

As shown in FIGS. 1A to 2B, connectors 16a, 16b are provided on the control substrate 10.

Four optical fiber cables 56, for example, are inserted in each of the connectors 16a, 16b. The cable conductors 58 of the optical fiber cables 56 are inserted in the connectors 16a, 16b.

The optical switch according to the present embodiment has such structure.

Next, an operation principle of the optical switch according to the present embodiment will be explained with reference to FIG. 6.

FIG. 6 is a conceptual view of the operation principle of the optical switch according to the present embodiment.

A shown in FIG. 6, a voltage is applied to the prism electrodes $18b_1$ to $18b_4$, and no voltage is applied to the prism electrodes $18a_1$ to $18a_4$.

Because of the voltage applied to the prism electrodes $18b_1$ to $18b_4$, a refractive index is changed in the prism region sandwiched between the prism electrodes $18b_1$ to $18b_4$ and the substrate 14. When a refractive index of the optical waveguide layer 40 in the region where the prism region is not formed is n, a refractive index in the prism region sandwiched by the prism electrodes $18b_1$ to $18b_4$ and the substrate 14 is n−Δn.

On the other hand, because of no voltage applied to the prism electrodes $18a_1$ to $18a_4$, no prism region is formed between the prism electrodes $18a_1$ to $18a_4$ and the substrate 14, and the refractive index does not change. A refractive index between the prism electrodes $18a_1$ to $18a_4$ and the substrate 14 remain n.

Optical signals introduced into the slab optical waveguide layer 40 of the optical deflection substrate 14 are deflected every time when the optical signals pass through the prism region and advance along the optical path shown in FIG. 6.

Then, an operation of the optical switch according to the present embodiment will be explained with reference to FIGS. 7A and 7B.

FIG. 7A shows a state where the optical path is not changed, and FIG. 7B shows a state where the optical path is changed.

First, the state shown in FIG. 7A will be explained.

In the state shown in FIG. 7A, no voltage is applied to all the prism electrodes 18 of the light deflection substrates 14a, 14b. Accordingly, light signals introduced from the optical fiber cables 56a to 56d are led to the respective associated optical fiber cables 56e to 56h without the optical paths being changed.

In the state shown in FIG. 7B, voltages are suitably applied to the prism electrodes 18 of the light deflection substrates 14a, 14b. Accordingly, an optical signal introduced from the optical fiber cable 56b has the optical path changed to be led to, e.g., the optical fiber cable 56g. An optical signal introduced from the optical fiber cable 56c has the optical path changed to be led to, e.g., the optical fiber cable 56h. An optical signal introduced from the optical fiber cable 56d has the optical path changed to be led to, e.g., the optical fiber cable 56f. On the other hand, an optical signal introduced from the optical fiber cable 56a is led to the optical fiber cable 56e without the optical path being changed.

The optical switch according to the present embodiment is characterized mainly in that the prism electrodes 18 and the control circuit are electrically connected by the pins 20.

As described above, in a case where voltages are applied to the prism electrodes by wires connected by bonding, the wiring is very complicated.

In a case where the optical waveguide substrate with the vias filled is directly mounted on the control substrate, and voltages are applied to the prism electrodes through the vias and solder bumps, as described above, in the joining processing shearing stresses are applied to the junction due to the thermal expansion coefficient difference between the control substrate and the optical waveguide substrate, with a resultant risk of lowered reliability.

In contrast to this, in the present embodiment, the control substrate and the prism electrodes 18 are electrically connected to each other via the pins 20. Each of the pins 20 has the base portion 20a and the columnar portion 20b, and the columnar portion 20b is formed thin and is flexible to external forces. Thus, according to the present embodiment, even in a case where thermal expansion coefficients of the control substrate 10 and the light deflection substrates 14a, 14b are very different from each other, the columnar portions 20b of the pins 20 are flexed corresponding to eternal forces, whereby junction is protected from being damaged in the joining processing. Thus, the optical switch according to the present embodiment can be highly reliable.

The optical switch according to the present embodiment is characterized also mainly in that the optical waveguide substrates 14a, 14b are mounted on the optical waveguide substrate 12 with the side of the optical deflection substrates 14a, 14b, where the slab waveguide layer 40 is formed opposed to the side of the optical waveguide substrate 12, where the slab optical waveguide substrates 14a, 14b are mounted.

According to the present embodiment, the optical waveguide substrates 14a, 14b are mounted on the optical waveguide substrate 12 with the side of the optical deflection substrates 14a, 14b, where the slab waveguide layer 40 is formed opposed to the side of the optical waveguide substrate 12, where the slab optical waveguide substrates 14a, 14b are mounted, which permits the slab optical waveguide layer 40 of the optical deflection substrates 14a, 14b and the slab optical waveguide layer 24 of the optical waveguide substrate 12 can be aligned with each other without failure. According to the present embodiment, good optical coupling can be realized between the slab optical waveguide layer 40 of the optical deflection substrates 14a, 14b and the slab optical waveguide layer 24 of the optical waveguide substrate 12. Resultantly, the optical switch according to the present embodiment can have good optical characteristics.

The optical switch according to the present embodiment is characterized also mainly in that the leaf springs 22a, 22b, 54 are sandwiched respectively between the control substrate 10 and the optical waveguide substrate 12, between the optical waveguide substrate 12 and the optical deflection substrates 14a, 14b.

According to the present embodiment, the optical deflection substrates 14a, 14b and the optical waveguide substrate 12 can be kept in close contact with each other by means of the leaf springs 22a, 22b, 54, whereby the slab optical waveguide layer 40 of the optical deflection substrates 14a, 14b and the slab optical waveguide layer 24 of the optical waveguide substrate 12 can be aligned with each other with high precision. Thus, the optical switch according to the present embodiment can have better optical coupling.

The optical switch according to the present embodiment is characterized also mainly in that the leaf springs 22a, 22b, 54 and the support plates 52a, 52b are formed of a conductor, and the light deflection substrates 14a, 14b are grounded by the leaf springs 54, the support plates 52a, 52b, etc.

According to the present embodiment, the light deflection substrates 14a, 14b are grounded by the leaf springs 54, the support plates 52a, 52b, etc., whereby the accumulation of static electricity in the light deflection substrates 14a, 14b can be prevented. Thus, according to the present embodiment, breakage of the elements due to the static electricity can be precluded, and the optical switch according to the present embodiment can be highly reliable.

(Modifications of the Embodiment)

The optical switch according to one modification of the present embodiment will be explained with reference to FIGS. 8A and 8B. FIGS. 8A and 8B are diagrammatic views of the optical switch according to the present modification.

The optical switch according to the present modification is characterized mainly in that a spacer 62 is provided between the optical deflection substrates 14a, 14b and the control substrate 10.

As shown in FIGS. 8A and 8B, the spacer 62 is provided between the optical deflection substrates 14a, 14b and the control substrate 10. Openings 64 are formed in the spacer 62 in a striped shape.

In the optical switch shown in FIGS. 1A to 2B, etc., the pins 20 are provided in the openings 32 in the optical waveguide substrate 12. However, in the present modification, the spacer 62 is sandwiched between the optical deflection substrates 14a, 14b and the control substrate 10, and the pins are provided in the openings 64 formed in the spacer 62.

As described above, it is possible that the spacer 62 is provided between the optical deflection substrates 14a, 14b and the control substrate 10, and the pins 20 are disposed in the openings 64 in the spacer 62.

[Modifications]

The present invention is not limited tot he above-described embodiment and can cover other various modifications.

For example, in the above-described embodiment, the pins 20 are provided with the base portions 20a positioned on the side of the control substrate 10, but the pins 20 may be provided with the base portions 20a positioned on the side of the optical deflection substrates 14a. 14b. In this case, the base portions 20a of the pins 20 are secured to the prism electrodes 18 by solders of a high melting point, and the columnar portions 20b of the pins 20 are secured to the electrode pads (not shown) of the control substrate 10 by means of solders of a low melting point.

In the above-described embodiment, the prism electrodes 18 and the control circuit are electrically connected to each other by the pins 20. However, the pins 20 are not essential, and a wide variety of conductors which are flexible to external forces can be used.

In the modification of the above-described embodiment, the pins are disposed in the opening 64 formed in the spacer 62, but the pins are not provided essentially in the openings. That is, a spacer is disposed between the optical deflection plates 14a, 14b and the control substrate 10, and the pins are disposed between the optical deflection substrates 14a, 14b and the control substrate 10.

In the above-described embodiment, the present invention is explained by means of an optical switch with four optical fibers inserted in. However, the optical switch may accommodate a larger number of optical fibers, but the prism electrodes corresponding to the number of the optical fibers must be provided.

What is claimed is:

1. An optical device comprising:
a first substrate with a control circuit formed thereon; and
a second substrate disposed above the first substrate and including an optical waveguide layer having a refractive index changed by electro-optic effect and a prism electrode that applies a voltage to the optical waveguide layer,
the control circuit and the prism electrode being electrically connected by a conductor,
the conductor having a columnar middle portion that is thinner than both end portions and the columnar middle portion is flexible in response to an applied external force.

2. An optical device comprising:
a first substrate with a control circuit formed thereon;

a second substrate disposed above the first substrate and including an optical waveguide layer having a refractive index changed by electro-optic effect and a prism electrode that applies a voltage to the optical waveguide layer, the control circuit and the prism electrode being electrically connected by a columnar conductor; and a third substrate disposed at least between the first substrate and the second substrate; and in which the optical waveguide layer is formed on the side of the surface of the second substrate opposed to the third substrate, the prism electrode is formed on the side of the surface of the optical waveguide layer opposed to the third substrate, another optical waveguide layer optically connected to the optical waveguide layer, is formed on the third substrate, and the columnar conductor is disposed in an opening formed in the third substrate.

3. An optical device comprising:

a first substrate with a control circuit formed thereon;

a second substrate disposed above the first substrate and including an optical waveguide layer having a refractive index changed by electro-optic effect and a prism electrode that applies a voltage to the optical waveguide layer, the control circuit and the prism electrode being electrically connected by a conductor;

a spacer disposed between the first substrate and the second substrate; and a third substrate disposed on the first substrate, and in which the optical waveguide layer is formed on the side of the surface of the second substrate, opposed to the spacer, the prism electrode is formed on the side of the surface of the optical waveguide layer, opposed to the spacer, and another optical waveguide layer optically connected to the optical waveguide layer is formed on the third substrate.

4. An optical device according to claim 3, wherein the columnar conductor is disposed in an opening formed in the spacer.

5. An optical device according to claim 1, wherein one of the end portions is a base portion formed in one-piece with the columnar middle portion, and the base portion supports the columnar middle portion.

6. An optical device according to claim 2, further comprising a base portion formed in one-piece with the columnar conductor and supporting the columnar conductor.

7. An optical device according to claim 3, further comprising a base portion formed in one-piece with the columnar conductor and supporting the columnar conductor.

8. An optical device according to claim 5, wherein the other of the end portions is a solder bump.

9. An optical device according to claim 2, wherein the columnar conductor is connected by a solder bump.

10. An optical device according to claim 3, wherein the columnar conductor is connected by a solder bump.

11. An optical device according to claim 2, further comprising a spring for keeping the second substrate and the third substrate in close contact with each other.

12. An optical device according to claim 3, further comprising a spring for keeping the second substrate and the third substrate in close contact with each other.

13. An optical device according to claim 11, wherein the spring is a leaf spring.

14. An optical device according to claim 12, wherein the spring is a leaf spring.

15. An optical device according to claim 11, wherein the spring is formed of a conductor.

16. An optical device according to claim 12, wherein the spring is formed of a conductor.

17. An optical device according to claim 11, wherein the second substrate is ground via the spring.

18. An optical device according to claim 12, wherein the second substrate is ground via the spring.

19. An optical device, comprising:

a first substrate; and a first optical waveguide substrate disposed above the first substrate and having a prism electrode, wherein the first substrate and the prism electrode are electrically connectable by a conductor having a middle portion that is thinner than both end portions and the middle portion is flexible in response to an applied external force.

20. The optical device according to claim 19, further comprising a spacer disposed between the first substrate and the first optical waveguide substrate, wherein the pin is disposed in an opening in the spacer.

* * * * *